Nov. 22, 1966  M. L. VAIL  3,287,639
PRECISION A.C. PHASE SENSOR
Filed Oct. 8, 1964  3 Sheets-Sheet 1

INVENTOR
MARION L. VAIL

BY  Harry A. Herbert, Jr
and Robert Kern Duncan
ATTORNEYS

INVENTOR
MARION L. VAIL

BY Harry A. Herbert, Jr.
and Robert Kern Duncan
ATTORNEYS

United States Patent Office 3,287,639
Patented Nov. 22, 1966

3,287,639
PRECISION A.C. PHASE SENSOR
Marion L. Vail, 1348 Ironwood Drive, Fairborn, Ohio
Filed Oct. 8, 1964, Ser. No. 402,670
2 Claims. (Cl. 324—91)

The invention that is described herein may be manufactured and used by or for the United States Government for governmental purposes without the payment to me of any royalty thereon.

This invention relates to apparatus for testing the phase relationship between two alternating current voltages. More specifically it relates to apparatus for testing the accuracy of A.C. power line synchronizing equipment.

Many different types and models of automatic synchronizing equipment are available for automatically switching, without power interruption, an additional alternating current generator across an A.C. power line. The paralleling of an additional generator may be desirable due to an increase in the electrical load on the line, or it may be desirable to add a generator to the line so that an existing electrical power supplying generator may be removed for repair, maintenance or service. The additional generator to be paralleled having been previously set to the line voltage and frequency, the automatic synchronizing equipment closes the electrical contactor placing the new generator across the line as the phase of the new generator coincides, or nearly so, with the phase of the line voltage. High inertia flywheels attached to rotating engine generators increases the magnitude of the surge of the transfer of energy from the electrical system to the mechanical system or from the mechanical system to the electrical system as the engine generator tends to lag or to lead the line voltage when the contactor closes with the two voltages out of coincidence. Excessive torsional stresses occur in connection couplings and shafts if synchronizing is not held within close limits. Any disparagement between the phase relationship of the new generator going on the line and the phase of the line results in a momentary transient or pulse in the voltage and current supplied by the line. Some equipment supplied power by an A.C. line can tolerate a relatively large transient, however, a great many pieces of electrical equipment such as digital computers, communication equipment, electronic surveillance equipment, and many others cannot accept, without malfunction, any transients in their source of power other than those of a very minor magnitude. Thus it is quite important that synchronizing equipment be maintained so that its accuracy of switching is not impaired. This invention sets forth the apparatus for determining the accuracy of such synchronizing equipment.

It is thus an object of the present invention to provide an A.C. phase sensor that will indicate the phase relation of two A.C. signals.

It is another object of the present invention to provide a system of electrical appartus for monitoring and determining the operating characteristics of automatic synchronizing equipment for paralleling A.C. generators.

It is another object of the present invention to provide a system that will indicate a leading or lagging phase relation compared to a reference.

It is another object of the present invention to provide an instrument that will measure the phase separation between two electrical generating systems with a high degree of accuracy that has no mechanically moving parts, and that has virtually no inertia or lag in response.

Additional objects and advantages will be forthcoming to those comprehending the included drawings and descriptions.

In brief, the invention herein disclosed samples the reference A.C. line voltage and produces a narrow pulse at a predetermined point in the voltage cycle. Thus, the phase of the generated pulse is delayed a fixed amount with respect to its parent voltage. In a similar manner with similar circuitry the test voltage from the source to be paralleled across the line is sampled and a narrow pulse produced at a predetermined point in its cycle corresponding to the same point in its cycle as the aforementioned predetermined point in the reference cycle (that is, the phase delays of the two pulses are made the same). These two pulses are compared on an indicator having a common time base, preferably one synchronized with the reference voltage. The time interval between the pulses is proportional to the phase of the voltages and the relative positions of the pulses indicate the leading and lagging frequency. This interval may be visually observed just prior to the closing of the automatic synchronizing apparatus, and the accuracy of the synchronizing apparatus evaluated. Calibration of the test channel with the reference channels is accomplished by connecting both channels to the same voltage and by a manual adjustment the generated pulses are placed in coincidence.

Prior to this invention the accuracy with which automatic synchronizing equipment operated has crudely been determined by observing the dimming in electric lamps connected across the A.C. line, or the loudness of the "grunt" of the alternator, at the closing of the paralleling switch. More refined methods of determining the phase relationship of two generators has involved the use of the primary of a transformer connected across each source and the secondaries of the transformers connected in series with an incandescent lamp. The degree of illumination of the lamp is thus an indication of the relative phase relationship. A null reading voltmeter is quite frequently substituted for the lamp. Another common type of device used to indicate the degree of synchronism of two A.C. sources is commercially known as a synchroscope. In its general form this device incorporates a moving iron vane or moving solenoid to drive a mechanical pointer or indicator across a scale. This instrument has been in use for many years and in general has been accurate enough for lighting and rotational power circuits. These instruments while called synchroscopes, are not to be confused with the more modern cathode-ray synchroscope used in radar techniques. Quite frequently a two-channel oscilloscope is used to determine the degree of synchronization by the simultaneous display of the two voltages. It is, however, difficult to tell which is the leading sine wave as the voltages approach, and shift through, synchronization. When one cyclic trace appears to coincide with the other synchronization is assumed.

The embodiment of the device herein disclosed in detail when used with conventional 60 hertz current systems generates two pulses, each being approximately 83 microsecond width or about $1/200$ of a cycle. It is readily apparent that the degree of the coincidence of these narrow pulses can visually be ascertained to a much greater magnitude, on an oscilloscope or other suitable indicator, than the similar observance of degree of coinciding of two sine waves.

Accuracies of the commercial synchroscopes are of the order of 10%. The accuracy of the detailed embodiment herein is better than $1/2\%$.

In the drawings:
FIG. 1 is a block diagram showing a typical use of the invention.
FIG. 2 is a block diagram of subject invention.
FIG. 3 is a schematic diagram of an embodiment of the pulse generators of this invention.

FIG. 4 is a drawing of a photograph of the traces on a two-channel cathode-ray oscilloscope showing the amplitude-time comparison of an input sine wave at 101 and 102 and the voltage across the primary of transformer 33 at 103 and 104 (refer to schematic diagram of FIG. 3 for voltage pick-off points).

FIG. 5 is a drawing of a photograph of the traces on a two-channel cathode-ray oscilloscope showing the amplitude-time comparison of an input sine wave at 101 and 102 and the voltage across the secondary of transformer 33 at 105 and 106.

FIG. 6 is a drawing of a photograph of the traces on a two-channel cathode-ray oscilloscope showing the amplitude-time comparison of an input sine wave at 101 and 102 and the voltage between the control electrode, commonly called the gate, of the silicon controlled rectifier and its cathode, i.e., points 107 and 106.

FIG. 7 is a drawing of a photograph of the traces on a two-channel cathode-ray oscilloscope showing the amplitude-time comparison of an input sine wave at 101 and 102 and the voltage between the anode and the cathode of the silicon controlled rectifier.

FIG. 8 is a drawing of a photograph of the traces on a two-channel cathode-ray oscilloscope showing the amplitude-time comparison of an input sine wave at 101 and 102 and the output pulse at points 108 and 109.

Figure 1:
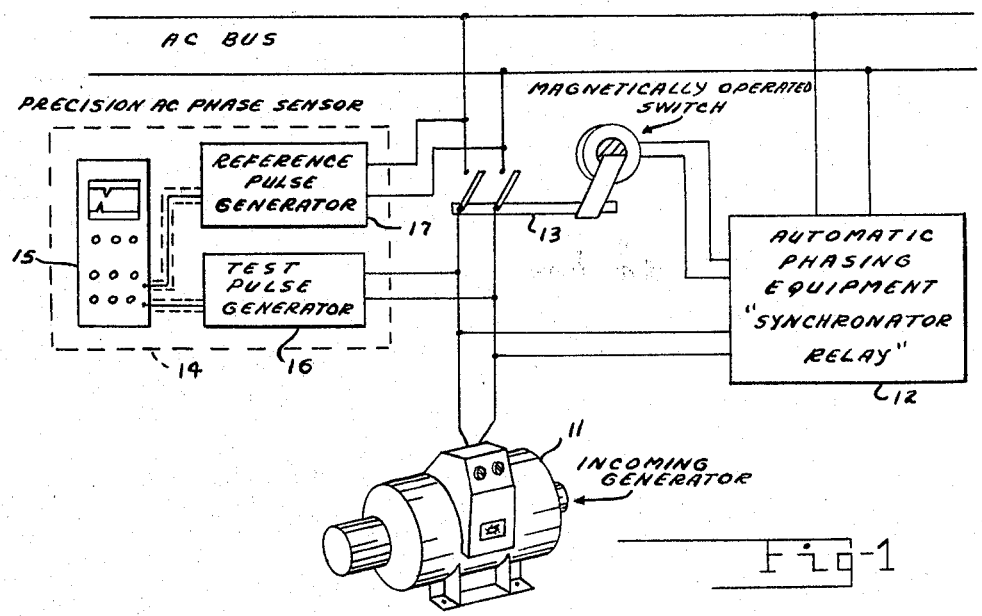

Referring to FIG. 1, it is desired to switch alternating current generator 11 across the A.C. bus so that all or part of the load on the bus may be borne by the generator. The purpose of the automatic phasing equipment 12 is to energize the magnetically operated switch 13 as the wave shape of the voltage from the incoming generator coincides with the A.C. wave existing on the bus line. Thus, ideally, when switch 13 closes, placing the generator on the line, the two A.C. voltage waves are in synchronism and there is no phase difference between them. This invention, the precision A.C. phase sensor 14, will indicate the accuracy with which this switching takes place. This indication is presented on the indicator 15, which may be a two-channel cathode-ray oscilloscope, by the time comparison of two generated pulses; one pulse bearing a definite time relation with the voltage wave on the bus and the other pulse having a definite time relation to the voltage wave generated by the generator 11. In FIG. 1, if it is assumed that the pulse generated by pulse generator 17, representing the phase of the bus voltage, is the lower trace on the indicator then the relative positions of the two pulses indicate that the phase of the incoming generator is lagging the A.C. bus voltage.

By disconnecting the connections to the switch from either or both the bus and the incoming generator the degree of synchronism at the time of switch actuation may be observed and the operation of the equipment thus determined without the actual paralleling of the generator across the line. In this manner the invention herein provides a very valuable piece of maintenance test equipment.

Figure 2:
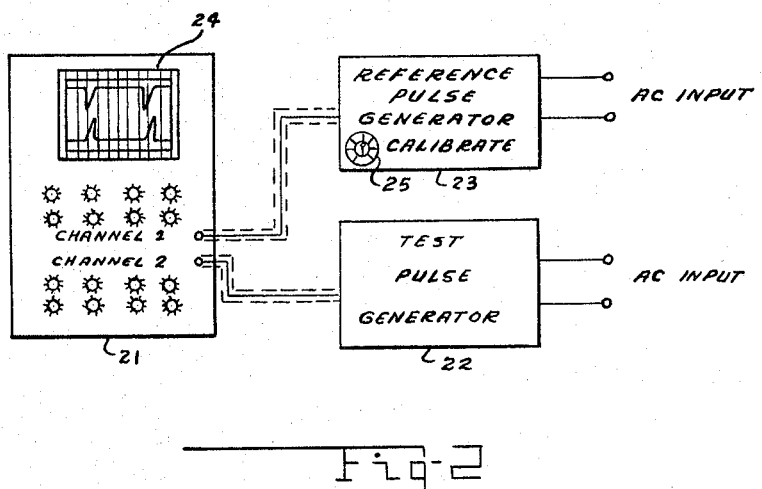

FIG. 2, a more detailed block diagram of the invention, shows how a graticule 24 may be calibrated in electrical degrees in accord with the sweep rate of the oscilloscope and superimposed over the face of the display to indicate the actual phase separation of the voltages. In this embodiment, block diagrammed in FIG. 2, the reference pulse generator 23 is provided with a calibrate control 25. To calibrate the instrument both the A.C. input to the reference pulse generator 23 and the A.C. input to the test pulse generator are connected across the same A.C. line and the calibrate control adjusted until the two sets of pulses coincide in time.

In the illustration of FIG. 2 the variable common time base sweep on the indicator 21 is set at such a rate that two pulses on each trace appear. By expanding or compressing the common sweep rate different values of electrical degrees will be represented by the divisions of the graticule 24.

Indicator 21 may be a conventional two-gun cathode-ray oscilloscope, a single gun cathode-ray oscilloscope with a time-shared switched input providing a two-channel display, or other two-channel recording or indicating means compatible with the frequencies being examined.

Figure 3:
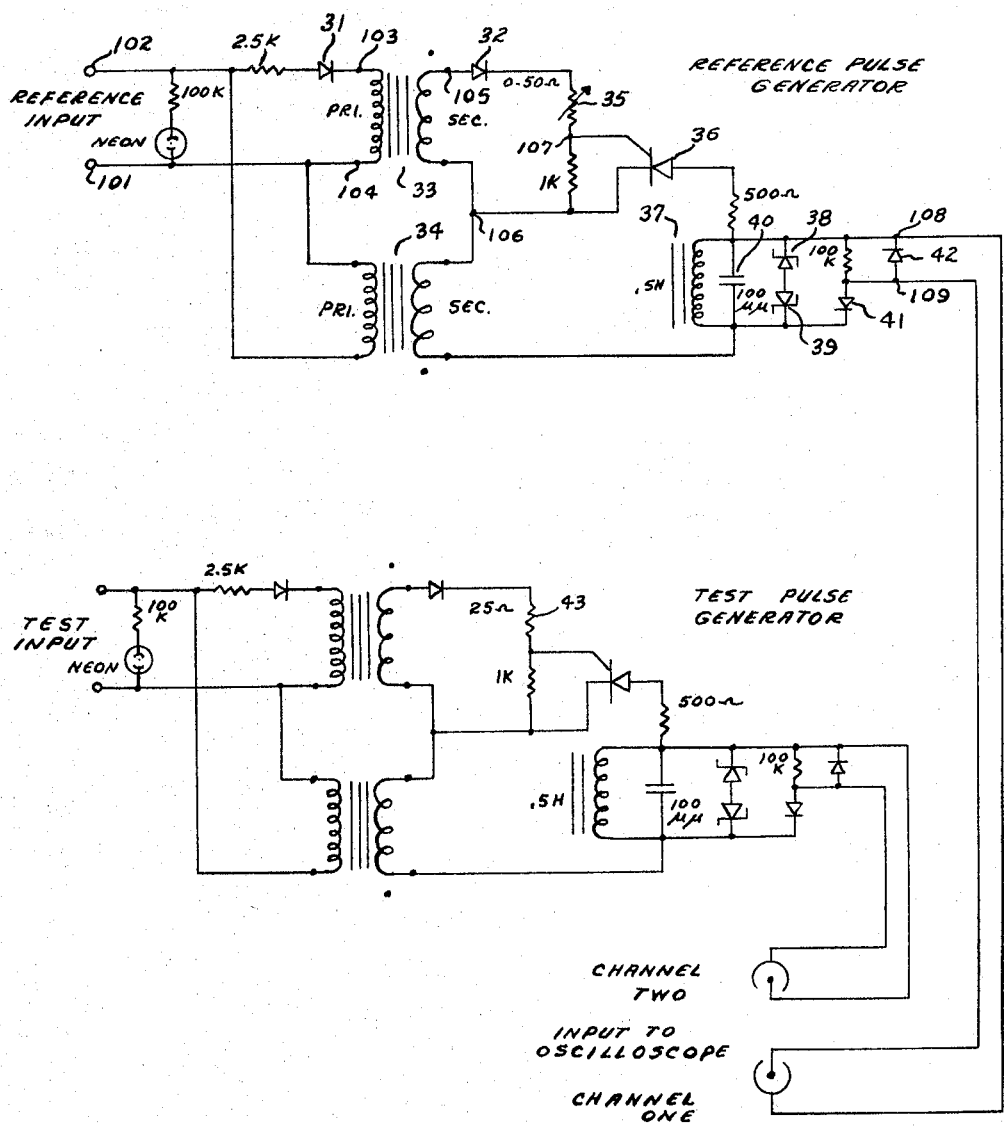
Figure 4:
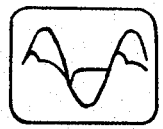
Figure 6:
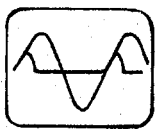
Figure 5:
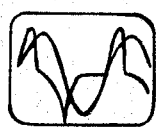
Figure 7:
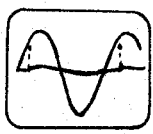
Figure 8:
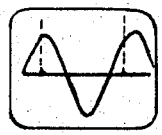

FIG. 3 shows in detail the schematic diagram of the reference pulse generator and the test pulse generator in an embodiment for nominal 117 volt 60 hertz. Component values are given for illustrative purposes and it is to be understood that the invention is not to be thereby limited. The two generators are shown to be identical, except for the calibrate variable resistor 35 in the reference pulse generator and the fixed resistor 43 in the test pulse generator. For economy of manufacturing it may be desirable to make both pulse generators identical; both having variable resistors. The voltage, determined by the resistive divider, between the control electrode of the silicon controlled rectifier, at point 107, and the cathode of the silicon controlled rectifier, at point 106, determines the point of conduction on the voltage wave impressed on the silicon controlled rectifier, which determines the phase delay of the current flowing between the anode and the cathode of the silicon controlled rectifier. This in turn determines the relationship of the output pulse of the pulse generator to the cyclic onset of the A.C. wave impressed on the pulse generator; as is shown in FIG. 8.

For convenience in pulse shaping it has been found desirable to use a 400 hertz 117 volt to 6.3 volt transformer 33. Transformer 34 may be a 117 volt to 6.3 volt 60 hertz component. The conventional diodes, i.e., 31, 32, 41 and 42 in this operating embodiment are type 1N547. Zener diodes 38 and 39 are type 1N3042, and the silicon controlled rectifier 36 is a type 2N1600. The half henry inductor 37 and the 100 micromicrofarad capacitor 40 form a parallel resonant circuit. The D.C. resistance of the inductor in the embodiment being described is approximately 24 ohms.

The Zener diodes 38 and 39 limit the pulse amplitude to approximately 80 volts and provide a flat topped pulse of approximately 83 microseconds duration. Diodes 41 and 42 provide a unidirectional polarity to the output pulse.

Figure 9:
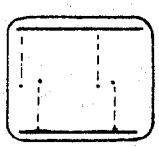
FIG. 9 is a drawing of a photograph of the indicator of the precision A.C. phase sensor showing the phase relation of two input voltages.
Figure 10:
FIG. 10 is a drawing of a photograph of the indicator of this invention showing the two voltages approaching an in-phase condition.
Figure 11:
FIG. 11 is a drawing of a photograph of the traces of the same voltages as in FIG. 10 except that the sweep frequency of the oscilloscope has been increased resulting in an expanded presentation of the phase relationship of the two input voltages.

FIGS. 4, 5, 6, 7 and 8 show wave shapes of the operating characteristics at points within one of the pulse generator channels compared to a sine wave on its input terminals. FIGS. 9, 10 and 11 show the presentation on the indicator of the invention when comparing the phase characteristics of two A.C. signals. This, in conjunction with the prior descriptions of the figures, places them in a self-explanatory position.

For illustrative and descriptive purposes certain embodiments of the subject invention have been disclosed, details have been set forth to aid in the teaching but it is to be understood that the invention is not to be limited thereby and that many variations are contemplated to be commensurable to the spirit and scope of the invention as set forth in the accompanying claims.

I claim:

1. Apparatus for the measurement of the phase relationship of a nominal 60 hertz voltage being tested and a nominal 60 hertz reference voltage, the said apparatus comprising:

(a) a first pulse generator means including a 400 hertz transformer having a primary and a secondary winding; a first diode connected in series with the said 400 hertz transformer primary winding; means for connecting the said primary winding and series connected diode across the said reference voltage; a silicon controlled rectifier having an anode, a cathode, and a control electrode; a second diode; a manually variable resistive voltage divider means; means for connecting in series relationship the said 400 hertz transformer secondary winding, the said second diode, and the said manually variable resistive voltage divider means; connecting means cooperating with the said manually variable voltage divider means and the said control electrode and cathode of the silicon controlled rectifier providing a manually adjustable control voltage between the control electrode and the cathode of the said silicon controlled rectifier; a 60 hertz transformer having a primary winding and a secondary winding; an inductive-capacitive parallel resonant circuit; means for connecting the said resonant circuit, the said secondary winding of the 60 hertz transformer, and the anode and cathode of the silicon controlled rectifier in series relationship; Zener diode means connected in parallel with the said parallel resonant circuit to provide a flat-topped pulse; a series-parallel network comprising a third diode connected in series with a parallel connected fourth diode and resistance for providing a unidirectional pulse; connecting means for connecting the said series parallel network in parallel with the said Zener diode means; connecting means cooperating with the said parallel connected diode and resistance for providing a reference output pulse whereby the said reference output pulse whereby the said reference output pulse has a manually variable determined phase delay with respect to the said reference voltage;

(b) a second pulse generator means including a 400 hertz transformer having a primary and a secondary winding; a first diode connected in series with the said 400 hertz transformer primary winding; means for connecting the said primary winding and series connected diode across the said voltage being tested; a silicon controlled rectifier having an anode, a cathode, and a control electrode; a second diode; resistive voltage divider means; means for connecting in series relationship the said 400 hertz transformer secondary winding, the said second diode and the said resistive voltage divider means; connecting means cooperating with the said voltage divider means and the said control electrode and cathode of the silicon controlled rectifier providing a control voltage between the control electrode and the cathode of the said silicon controlled rectifier; a 60 hertz transformer having a primary winding and a secondary winding; an inductive-capacitive parallel resonant circuit; means for connecting the said resonant circuit, the said secondary winding of the hertz transformer, and the anode and cathode of the silicon controlled rectifier in series relationship; Zener diode means connected in parallel with the said parallel resonant circuit to provide a flat-topped pulse; a series-parallel network comprising a third diode connected in series with a parallel connected fourth diode and resistance for providing a unidirectional pulse; connecting means for connecting the said series-parallel network in parallel with the said Zener diode means; connecting means cooperating with the said parallel connected fourth diode and resistance for providing a test output pulse whereby the said test output pulse has a determined phase delay with respect to the said voltage being tested; and (c) indicating means having a common time base cooperating with the said first pulse generator and the said second pulse generator for displaying the said reference output pulse and the said test output pulse whereby the phase relationship between the voltage being tested and the reference voltage is indicated.

2. The apparatus of claim 1 wherein the said indicating means comprises a two channel oscilloscope having a variable common time base sweep.

References Cited by the Examiner
UNITED STATES PATENTS

| | | | |
|---|---|---|---|
| 2,442,123 | 5/1948 | Espley et al. | 324—91 X |
| 2,931,217 | 4/1960 | Wendt et al. | 324—88 X |
| 3,078,415 | 2/1963 | Frelich | 324—88 |
| 3,229,204 | 1/1966 | Poehlman | 324—83 |

WALTER L. CARLSON, *Primary Examiner.*

P. F. WILLE, *Assistant Examiner.*